Oct. 29, 1929.  A. KRUSCHKA  1,733,125
SOLDERING IRON
Filed April 11, 1923
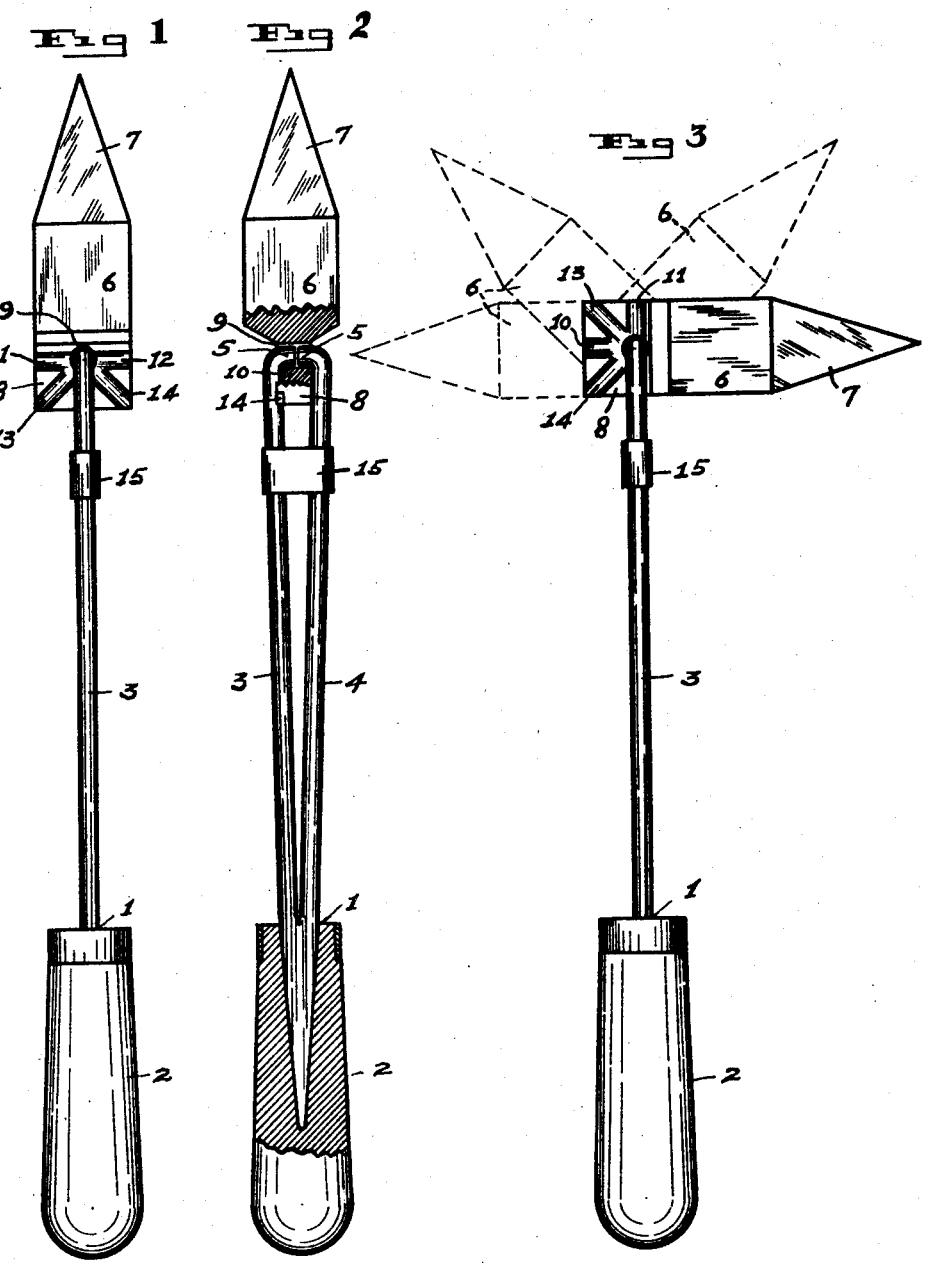
INVENTOR
Anton Kruschka
By Jae R Snyder
Attorney Patented Oct. 29, 1929

1,733,125

UNITED STATES PATENT OFFICE

ANTON KRUSCHKA, OF PITTSBURGH, PENNSYLVANIA

SOLDERING IRON

Application filed April 11, 1928. Serial No. 269,085.

My invention relates to certain new and useful improvements in soldering irons, and the primary object thereof is to provide a soldering iron of the character described which embodies a heating bit that is adjustable relatively to the handle element and further readily detachable from the latter.

Other objects of the invention are to provide a device of the type stated which is simple in its construction and arrangement, strong, durable and efficient in its use, convenient in its operation, and comparatively inexpensive to manufacture.

With the foregoing and other objects in view which will appear as the description proceeds, the invention resides in the combination and arrangement of parts and in the details of construction hereinafter described, it being understood that changes in the precise embodiment of the invention hereinafter disclosed can be made within the scope of what is claimed without departing from the spirit of the invention.

In the drawing wherein like numerals of reference designate corresponding parts throughout the several views:—

Figure 1 is a side view of a soldering iron constructed in accordance with the invention, and with the heating bit extending in alignment with the handle element.

Figure 2 is a similar view, partly in cross section, at right angles with respect to the view shown in Figure 1.

Figure 3 is a side view of the device with the heating bit disposed at right angles with respect to the handle element, and illustrating various other possible positions of the heating bit in dash lines.

Referring in detail to the drawing 1 denotes the handle element, of the device, comprising a ferruled hand grip 2, and a pair of elongated clamping arms, respectively indicated at 3 and 4.

The clamping arms 3 and 4 are constructed from resilient metal rods, and have their inner ends joined and detachably fixed in the hand grip 2. The outer, free ends of the clamping arms 3 and 4, are bent inwardly toward each other to provide the free inturned end portions 5, which extend at right angles relatively to the longitudinal disposition of respective clamping arms 3 and 4.

The heating bit 6 is preferably constructed from a block of copper and is of the usual configuration, having a tapering outer end portion 7. The inner end of the heating bit 6 is reduced to form a flat shank 8 having the same width as the main portion of the heating bit 6.

The shank 8 is provided with an aperture 9 for the reception of the inturned end portions 5. The aperture 9 is disposed centrally of the width of the shank 8 and in close proximity to the connected end of the latter.

One side of the shank 8 is formed with a plurality of grooves, respectively indicated at 10, 11, 12, 13 and 14, which are disposed radially relatively to the axial or diametric center of the aperture 9 and merge into the latter. The groove 10 is disposed in alignment with the longitudinal center of the heating bit 6 and the grooves 11 and 12 are disposed on respective sides of the aperture 9, and extend at right angles with respect to the groove 10. The grooves 13 and 14 extend at an angle of forty five degrees relatively to the groove 10, and are disposed on respective sides of the latter.

The grooves 10, 11, 12, 13 and 14 are provided for the engagement of the outer end portion of the clamping arm 3. A clamping band 15 surrounds the clamping arms 3 and 4, and when the former is forced toward the heating bit 6, the latter will be fixedly held in position at the outer ends of the clamping arms 3 and 4.

By positioning the outer end of the clamping arm 3 in respective grooves 10, 11, 12, 13 and 14, the bit may be disposed to extend in alignment with the handle element 1, at right angles to the latter in either direction, or at an angle of forty five degrees, relatively to the handle element 1, in either direction. The engagement of the inturned portions 5 in the bit aperture 9, and the engagement of the outer end portion of the clamping arm 3 in respective grooves 10, 11, 12, 13 and 14, together with the clamping action of the band 15, will fixedly hold the bit 6 in the desired position.

The present invention provides a most efficient device of its kind that will greatly facilitate soldering operations, as it embodies a heating bit that may be readily adjusted, relatively to the handle element, to best meet conditions found in practice. Further, the detachable handle element 1 may be used in common with a plurality of different sized and shaped heating bits, thereby obviating the necessity of requiring a separate handle element with each separate heating bit of the integral type now commonly in use.

The convenient separation of the grip 2 and of the heating bit 6 from the clamping arms 3 and 4, permits of the parts of the device to be compactly packed together, facilitating the storage and transportation of the device.

What I claim is:

1. A soldering iron of the character described comprising a handle element including a pair of resilient clamping arms having inturned free end portions, a heating bit provided with a flat shank, said shank formed with an aperture for the reception of said inturned end portions of said pair of clamping arms, one side of said shank being provided with a plurality of grooves, said grooves extending radially with respect to the axial center of said aperture and merging into the latter, and means carried on said pair of clamping arms for detachably securing the latter to said shank, one of said pair of clamping arms engaging in one of said grooves.

2. A soldering iron of the character described comprising a handle element including a pair of resilient clamping arms having inturned free end portions, a heating bit provided with a flat shank, said shank formed with an aperture for the reception of said inturned end portions of said pair of clamping arms, one side of said shank being provided with a plurality of grooves, said grooves extending radially with respect to the axial center of said aperture and merging into the latter, and a clamping band shiftably carried on said pair of clamping arms for detachably securing the latter to said shank, one of said pair of clamping arms engaging in one of said grooves.

In testimony whereof I affix my signature.

ANTON KRUSCHKA.